3,254,038
ADHESIVE COMPOSITION COMPRISING PHENOL-
IC RESIN, A TANNIN AND AN ALKALI METAL
HYDROXIDE
Thomas F. Duncan and Richard D. Putnam, Bainbridge,
N.Y., assignors to The Borden Company, New York,
N.Y., a corporation of New Jersey
No Drawing. Filed July 20, 1962, Ser. No. 211,433
7 Claims. (Cl. 260—17.2)

This invention relates to a modified phenolic resin composition and to articles bonded therewith. The invention is particularly useful as the adhesive in wood particle board and will be illustrated by description in connection with such use.

As the binder in particle board or the like, quebracho tannin has been used heretofore in combination with a source of formaldehyde and aqueous sodium hydroxide. The combination is unsatisfactory, partly because of short pot life and lack of adequate water resistance of the board bonded therewith.

The present invention provides an adhesive which avoids these and other advantages. It prvoides an adhesive that has such long pot life that it can be compounded in advance and stored, yet cures quickly at the elevated temperatures of hot pressing.

We extend the usable pot life and, at the same time, establish a desirable setting rate at the elevated temperature of use by incorporating phenol formaldehyde resin.

The invention comprises a tannin, an alkali metal hydroxide, and a phenolic resin, all being used in a water dispersion. The commercial embodiment of the invention includes also a curing agent of which paraformaldehyde is an example.

As to materials, the phenol formaldehyde resin is of the resole type. They are alkali soluble. A suitable one is made by the base-catalyzed condensation of 1–3 moles and ordinarily about 1.5–2.5 moles of formaldehyde with 1 of phenol. Resins that give the best results in our compositions are made with about 2 moles of formaldehyde to 1 mole of phenol and 1%–10% of sodium hydroxide on the dry weight of the condensate.

For satisfactory storage life of the compounded glue in cold condition, i.e., without increase of viscosity to an objectionably high level, the phenol formaldehyde should be condensed, during its preparation, to an advanced state corresponding to a viscosity of at least about 100 cps. and, for best results at least 300 as measured at 25° C. on an aqueous alkaline solution of about 53% of resin solids, based on a composition as described in Example 10.

In place of the phenol we may use equimolar amounts of a cresol or a xylenol or mixtures thereof.

The tannin is one of the vegetable phlobaphene tannins or flavotannin extracts, identifiable by heating with dilute mineral acid when an insoluble phlobaphene or like product forms, by containing a phenol in a complex mixture of materials, and giving a positive test for phenolic hydroxy groups. Examples of such tannins to be used are the water soluble extracts from quebracho, mimosa, cutch, gambier, wattle, canaigre, eucalyptus, hemlock, spruce, beech and mangrove. We recommend particularly the quebracho tannin.

As the alkali metal alkali, sodium hydroxide is entirely satisfactory as are also potassium and lithium hydroxides.

As the donor which is incorporated to provide formaldehyde at the time of the curing at elevated temperatures we find aqueous formaldehyde solutions or paraformaldehyde solutions particularly satisfactory.

The lignocellulosic particles are fragmented material in which the cellulosic fibers in the fragments are still bonded by native lignin. They may be and suitably are those that are usual in making particle boards as, for example, wood, flakes, splinters, or other particles of wood, e.g., aspen, Douglas fir, pine, gum, and poplar as well as other lignocellulosic agricultural wastes such as bagasse and flax shives. Chemically treated wood pulps are not satisfactory in making the particle board.

The selected lignocellulosic materials, as used, should be in the commercially dried condition. A suitable moisture content is that of the oven dried material of total moisture content, after the application thereto of the aqueous alkali resin binder solution, of about 9% to 15%. Best results are obtained when the particle board mixture subjected to the hot pressing operation has a total moisture content within the approximate range 10%–12%. For each 1% of increased moisture above this amount, the time required in the hot press cycle is increased by a substantial amount such as about a minute.

As to proportions, the tannin is used in the amount of about 10–90 parts and for best results 40–60 parts for 100 parts of total resin, i.e., the phenolic resin solids plus the tannin solids. Increasing the proportion of the tannin much above 70 parts decreases the strength of the bonded particle board unless a higher proportion of total adhesive is used on the surfaces to be adhered. Decreasing the proportion of the tannin, as to 30 parts, slows the curing rate and increases the time required for satisfactory curing in the hot press.

The sodium hydroxide is introduced in the amount of 30–125 parts for 100 of the total of tannin and resin solids. Best results are obtained, however, when the proportion of the caustic is not substantially above the proportion of said solids, as within the range 40%–100% of the total dry weight, the optimal being about 80%.

The proportion of the formaldehyde donor used is about 5–30 and suitably 15–22 parts of available formaldehyde for 100 parts of the tannin. An amount of paraformaldehyde corresponding to 18 parts for 100 of the tannin solids is an effective proportion. It avoids such an excessive level of free formaldehyde as would result in a short storage life and, on the other hand, provides under curing conditions an adequate amount to effect curing at the rapid rate desired.

The tannin is conveniently used in the form of an aqueous solution.

Conditions of compounding are those that are conventional in making adhesives for this type. The various materials are mixed cold, as at 5°–40° C., by stirring an aqueous alkaline solution of the resole resin with the tannin extract and paraformaldehyde and then admixing a solution of the desired proportion of sodium hydroxide or other alkali in portions and with cooling to avoid overheating. The solution so made is storable at room temperatures for 3 months or longer before use, without gelling.

In use, the whole aqueous adhesive composition is applied, as by spraying, upon the flakes, shavings, splinters or other wood fines that are to constitute the structural material of the particle board. The whole is blended and then pressed for the selected time and pressure, as at about 280°–380° F. or higher and ordinarily within the range 280°–320° F. for about 5–10 minutes, 7 being adequate. The amount of resin so applied in making the particle board is relatively low, e.g., 8.5%–17%, 10%–14% total solids being satisfactory and economical.

The invention will be further illustrated by detailed description in connection with the following specific examples, proportions here and elsewhere herein being expressed as parts by weight unless otherwise definitely stated to the contrary.

*Examples 1–6*

The following components in the proportions shown by weight were mixed thoroughly, the sodium hydroxide solution where indicated as in Example 3 being added last and the whole being cooled as this alkali was introduced slowly at a temperature maintained below 90° F., and used as the binder in aspen flake particle board.

"Sep." as related to the sodium hydroxide means that the alkali other than that used in the condensation was applied separately to the wood flakes before the other components of the glue were applied. The results as to internal bond strength and residual thickness expansion after boiling in water are best when the alkali is incorporated in advance in the resin solution.

The applications of total solids, actual resin etc., and caustic solids are shown as pounds dry weight for 100 pounds of oven-dried wood flakes.

The control compositions A and B are no part of the invention and appear only for purposes of comparison.

*Example 7*

This example shows particularly the effect of an excessive proportion of sodium hydroxide on the properties of the finished particle board as compared to Control C. It shows, for instance, that the modulus of rupture after the Double Boil test is only 2810 p.s.i. when the amount of alkali used is 5 parts for 4 of the resin solids. It is 4780 p.s.i. when the proportion of the alkali is 5 parts for 7 of the resin solids.

| | Example 7 | Control C |
|---|---|---|
| Components and Amounts Used: | | |
| Phenol Formaldehyde Resin (50% Solids) | 50 | 50 |
| Quebracho Tannin (50% Solids) | 50 | 50 |
| Paraformaldehyde | 4.5 | 4.5 |
| Sodium Hydroxide (50% Solution) | 78 | 136 |
| Total Solids Application, Percent of wood | 8.6 | 9.0 |
| Ratio of Resin to Actual NaOH, approx. | 7:5 | 4:5 |
| Physical Properties of Aspen Particle Boards: | | |
| Press Time, minutes | 9 | 9 |
| Specific Gravity | .76 | .73 |
| Modulus of Rupture, p.s.i. | 4,970 | 3,420 |
| Internal Bond, p.s.i. | 109 | [1] 78 |
| Water Absorption, Percent | 28.4 | [1] 34.2 |
| Thickness Expansion, Percent | 4.9 | [1] 7.6 |
| After Double Boil: | | |
| Modulus of Rupture, p.s.i. | 4,780 | [1] 2,810 |
| Strength Retention, Percent | 96 | 82 |
| Thickness Expansion, Percent | 3.0 | [1] 7.6 |

[1] These values are outside the range for satisfactory competitive particle board.

| Components and Proportions | Control A | Control B | Example Nos. | | | | | |
|---|---|---|---|---|---|---|---|---|
| | | | 1 | 2 | 3 | 4 | 5 | 6 |
| Phenol Formaldehyde Resin (50% Solids) | 100 | 50 | 50 | 50 | 50 | 50 | | 50 |
| Quebracho Tannin (50% Solids) | | 50 | 50 | 50 | 50 | 50 | 100 | |
| Mimosa Tannin (50% Solids) | | | | | | | | 50 |
| Para Formaldehyde | | 4.5 | 4.5 | 4.5 | 4.5 | 4.5 | 9.0 | 4.5 |
| Sodium Hydroxide (50% Soln.) | | | 31 | 70 | 78 | 109 | 84 | 70 |
| Sodium Hydroxide Application | | | ([1]) | ([1]) | ([2]) | ([1]) | ([1]) | ([1]) |
| Total Solids Application | 7.0 | 7.0 | 9.0 | 11.5 | 12.0 | 14.0 | 12.0 | 11.5 |
| Actual Resin, Tannin and Paraformaldehyde Solids Application, percent | 7.0 | 7.0 | 7.0 | 7.0 | 7.0 | 7.0 | 7.0 | 7.0 |
| Actual Caustic Solid Application, percent | | | 2.0 | 4.5 | 5.0 | 7.0 | 5.0 | 4.5 |

MAKING AND PHYSICAL PROPERTIES OF ¾″ ASPEN FLAKE BOARDS

| | | | | | | | | |
|---|---|---|---|---|---|---|---|---|
| Minimum Press Time, mins | [3] 10 | 7½ | 7½ | 7½ | 7½ | 7½ | 7 | 7½ |
| Board Specific Gravity | .77 | .70 | .68 | .68 | .72 | .70 | .72 | .70 |
| Modulus of Rupture, p.s.i. | 5,070 | 4,180 | 4,970 | 4,960 | 3,190 | 3,400 | 3,660 | 4,900 |
| Internal Bond, p.s.i. | 115 | [3] 71 | 120 | 88 | 123 | 86 | 79 | 87 |
| Water Absorption, percent [4] | 21.7 | 33.3 | 25.9 | 33.0 | 33.4 | 26.5 | 39.3 | 36.7 |
| Thickness Expansion, percent [4] | 4.2 | [3] 8.0 | 4.2 | 4.1 | 5.5 | 3.5 | [3] 8.5 | 4.5 |
| Double Boil Test: [5] | | | | | | | | |
| Modulus of Rupture, p.s.i. | 5,130 | [3] 2,780 | 4,210 | 4,225 | 3,250 | 4,500 | 2,950 | 4,260 |
| Strength Retention, percent | 100.0 | 66.5 | 85.0 | 85.0 | 100 | 100 | 81.0 | 87.0 |
| Thickness Expansion, percent | [3] 19.4 | [3] 26.0 | [3] 13.6 | 5.2 | 0.1 | 0.0 | [3] 10.6 | 4.4 |

[1] Sep.
[2] In resin.
[3] Value outside the range for satisfactory, competitive press time or properties of product.
[4] Based on 24 hour room temperature soak as outlined in A.S.T.M. D1037–60T.
[5] Double Boil Test Procedure consisted of boiling 4 hours, drying 20 hours at 220° F., boiling 4 hours, drying 20 hours at 220° F., and conditioning at 75° F., 57% Relative Humidity for 48 hours before testing.

Example No. 5 is a control test using no phenolic resin. The composition has an unsatisfactorily short pot life. The board of this example, although containing a desirable proportion of alkali, failed in the thickness expansion test.

The phenol formaldehyde resin solution used in these examples contained about 3.5% of sodium hydroxide and 46.5% of resin. The resin was made by the sodium hydroxide catalyzed condensation of 1 mole of phenol with 2 moles of formaldehyde.

Glues such as those of Examples 1–6 are low in cost because of the replacement of part or all of the phenol formaldehyde by the less expensive tannin, satisfactory in pot life, and quick curing in the hot press. When the sodium hydroxide is incorporated in advance into the composition in the amount of 50%–100% of the combined weight of the resin solids, the glue is satisfactory, we have found, also in the internal bond strength and in the dimensional stability tests of the boards made with the glue.

Control C having a resin solids to caustic solids ratio of 4:5 resulted in boards characterized by a drop in both initial strength and dimensional stability.

*Example 8*

The phenol formaldehyde resole of kind described is mixed in the proportion of 50 parts with 50 parts of the water soluble tannin extract of each of the woods, other than quebracho and mimosa, listed herein, 4.5 parts of paraformaldehyde and 78 parts of sodium hydroxide, all components except the paraformaldehyde being weighed and introduced in the form of 50% solutions in water.

The composition is mixed, applied to aspen wood flakes and the board pressed and cured as described in Example 1.

*Example 9*

The procedure and composition of Example 1 are used except that the paraformaldehyde is replaced by 4.5 parts of formaldehyde, e.g., as 10 parts of a 45% solution.

The procedures of application of the adhesive solution to the wood particles, pressing and curing are carried out as described in Example 1.

*Example 10*

This example shows the effect of condensing the phenol and formaldehyde to an advanced stage, in providing the resin component of the finished glue mix.

423 g. of phenol, 606 g. of 44% formaldehyde solution and 84 g. of 50% sodium hydroxide solution were reacted at about 80° C. Samples were removed from the flask when the resin reached Gardner viscosity A (Sample I), D (Sample II), G (Sample III), and O (Sample IV). 200 g. of each sample (of solids content about 53) were compounded with 180 g. of 55% quebracho tannin solution, 336 g. of 50% sodium hydroxide solution and 44 g. of 44% formaldehyde solution, the whole being cooled to below 40° C. and preferably below 30° C. during the compounding operation to avoid increase in viscosity possibly to gelling. The solids content (ASTM) of the total mixture was 49.11%. Viscosities at the start and after 35 days are tabulated below.

|  | Viscosity, cps. of Resin and Glue | | | |
| --- | --- | --- | --- | --- |
|  | Mix I | Mix II | Mix III | Mix IV |
| Resin Component at 25° C., cps | 50 | 100 | 165 | 370 |
| Initial Glue mix at 32° C | 550 | 368 | 362 | 362 |
| Mix after 35 days at 32° C | 3,200 | 855 | 555 | 475 |

It will be understood that it is intended to cover all changes and modifications of the examples of the invention herein chosen for the purpose of illustration which do not constitute departures from the spirit and scope of the invention.

We claim:
1. An adhesive composition comprising
   (a) a phenol formaldehyde resole resin,
   (b) a water soluble phlobaphene vegetable tannin,
   (c) alkali metal hydroxide and
   (d) a formaldehyde donor serving as the curing agent at elevated temperatures,
   (e) proportions on the dry basis being about 30–125 parts of the alkali metal hydroxide for 100 parts of total weight of the said tannin and resole resin solids.

2. The composition of claim 1, the said tannin being quebracho extract.

3. The composition of claim 2, the said alkali being sodium hydroxide in the proportion of about 50–100 parts by weight for 100 parts of the said tannin and resole resin solids.

4. The composition of claim 2, the said formaldehyde donor being chosen from the group consisting of aqueous formaldehyde and paraformaldehyde in the proportion of 5 to 30 parts for 100 parts of the quebracho extract on the dry basis.

5. In making a particle board the process which comprises
   (a) spraying the adhesive composition of claim 1 upon subdivided wood,
   (b) mixing the resulting sprayed material,
   (c) pressing the mixed material to shape, and then
   (d) heating it under compression until the adhesive composition is cured.

6. A particle board comprising lignocellulosic particles and the adhesive composition of claim 1 applied to the particles in the proportion of about 8.5–17 parts by weight on the solids basis for 100 parts of the particles, the board being compressed, and the adhesive being in the cured condition, said board as defined being stable against excessive residual thickness expansion after soaking in boiling water.

7. The board of claim 6, the particles being wood flakes and the said tannin being quebracho extract.

References Cited by the Examiner

UNITED STATES PATENTS

| 2,967,836 | 1/1961 | Moffitts et al. | 260—17.2 |
| 3,023,136 | 2/1962 | Himmelheber et al. | 260—17.3 |

FOREIGN PATENTS

| 723,884 | 2/1955 | Great Britain. |

WILLIAM H. SHORT, *Primary Examiner.*

JAMES A. SEIDLECK, LOUISE P. QUAST, *Examiners.*

JAMES NORRIS, *Assistant Examiner.*